United States Patent [19]

McCormick et al.

[11] Patent Number: 4,884,670
[45] Date of Patent: Dec. 5, 1989

[54] VARIABLE COMPLIANCE DEVICE

[75] Inventors: Peter E. McCormick, Dallas; Timothy D. Culbertson, Little Elm; Walter D. Autry, Jr., Keene, all of Tex.

[73] Assignee: EOA Systems, Inc., Dallas, Tex.

[21] Appl. No.: 168,489

[22] Filed: Mar. 15, 1988

[51] Int. Cl.[4] .................................................. F16D 7/02
[52] U.S. Cl. ...................................... 192/56 F; 901/29; 901/49
[58] Field of Search ................... 192/56 F, 150, 88 A; 901/49, 41, 29, 28; 464/36, 37, 38; 200/47, 573

[56] References Cited

U.S. PATENT DOCUMENTS

| | | | |
|---|---|---|---|
| 3,026,387 | 3/1962 | Ashbaugh | 200/82 C |
| 3,163,274 | 12/1964 | Bowerman et al. | 192/88 A |
| 3,252,303 | 5/1966 | Weasler et al. | 464/36 |
| 4,098,001 | 7/1978 | Watson | 33/169 CX |
| 4,255,946 | 3/1981 | Hansen | 464/36 |
| 4,276,697 | 7/1981 | Drake et al. | 33/169 C |
| 4,355,469 | 10/1982 | Nevins et al. | 33/185 R |
| 4,540,331 | 9/1985 | Stanner et al. | 901/29 X |
| 4,639,184 | 1/1987 | Knasel et al. | 901/49 X |
| 4,661,038 | 4/1987 | Kohler et al. | 901/49 X |
| 4,676,142 | 6/1988 | McCormick et al. | 901/29 X |
| 4,700,932 | 10/1987 | Katsuno | 901/49 X |
| 4,702,667 | 10/1987 | Hounsfield et al. | 901/49 X |
| 4,717,003 | 1/1988 | McCormick et al. | 192/56 F |

FOREIGN PATENT DOCUMENTS

WO88/01555 3/1988 PCT Int'l Appl. .................. 901/41

Primary Examiner—Rodney H. Bonck
Assistant Examiner—Janice E. Chartoff
Attorney, Agent, or Firm—Michael A. O'Neil

[57] ABSTRACT

A variable compliance device having a tool plate attached between a tool and a robot arm to allow limited movement of the tool plate relative to the robot arm. A concave bill seat connected to the tool plate and a pin having a concave surface house a bearing ball. An inflatable diaphragm exerts a force on a piston toward the pins to force the pins against the bearing balls. Movement of the tool plate relative to the robot arm causes the pins to move relative to the robot arm. The force of the diaphragm on the pins resists movement of the tool plate relative to the robot arm, and restores the tool plate to its original position after the outside force is removed. If the pins are moved beyond a selected point, a sensor senses the movement and sends a signal to shut down the robot.

16 Claims, 4 Drawing Sheets

{ 4,884,670 }

VARIABLE COMPLIANCE DEVICE

TECHNICAL FIELD

This invention relates in general to robotic tooling systems. More particularly, the invention relates to variable compliance devices for coupling robot tooling to robot arms.

BACKGROUND AND SUMMARY OF THE INVENTION

A variable compliance device is coupled between a robot arm and a robot tool to provide sufficient compensation to allow for slight misalignment between the robot tool and its environment. When the robot tool encounters a misaligned part or other obstruction, an outside force is applied to the tool. The variable compliance device alows the tool to rotate or to move laterally or longitudinally relative to the robot arm, without damaging the robot arm. When the outside force is removed, the compliance device restores the tool to its original position relative to the robot arm.

If excessive force is applied to a tool, the tool may be moved beyond the limits of the compliance device's ability. U.S. Pat. No. 4,717,003, issued Jan. 5, 1988, to McCormick et al., discloses and describes a variable compliance device that includes a means for sensing movement of a tool attached to the device and for shutting down the robot when an overload condition is encountered. The device can be adjusted by air pressure during operation of the device.

A variable compliance device may also include a quick change adapter, so the robot tool can be easily changed to a different type. A quick change adapter is disclosed and described in U.S. Pat. No. 4,676,142, ssued June 30, 1987, to McCormick et al.

The variable compliance device of the invention includes a tool plate for attachment to a tool and means for coupling the tool plate to a robot arm. The compliance device allows limited longitudinal, lateral, and angular movement of the tool plate relative to the robot arm.

A plurality of bearing balls are located in concave ball seats associated with the tool plate. A pin having a concave surface engages each bearing ball, so that longitudinal, lateral, or angular movement of the tool plate relative to the robot arm caused by an outside force causes at least one of the pins to move relative to the robot arm.

A bias means exerts a force against the pins toward the bearing balls. The force of the pins against the bearing balls resists movement of the tool plate relative to the robot arm. This force also restores the tool plate to its original position relative to the robot arm after the outside force is removed during compliance.

The bias means includes an inflatable diaphragm that can be inflated or deflated to a selected pressure. Inflating the diaphragm to a higher pressure increases the rigidity of the coupling, increasing the force required to move the tool plate relative to the robot arm. The higher pressure also increases the force that restores the tool plate to its original position.

The variable compliance device of the invention also includes a sensor that senses when any of the pins is moved beyond a selected point. The sensor then signals the robot to shut down in order to avoid damage to the robot, the tool, or the workpiece due to an excessive force.

BRIEF DESCRIPTION OF THE DRAWINGS

A more complete understanding of the invention may be had by reference to the following detailed description when taken in conjunction with the accompanying drawings, wherein.

DETAILED DESCRIPTION

Figure 1:
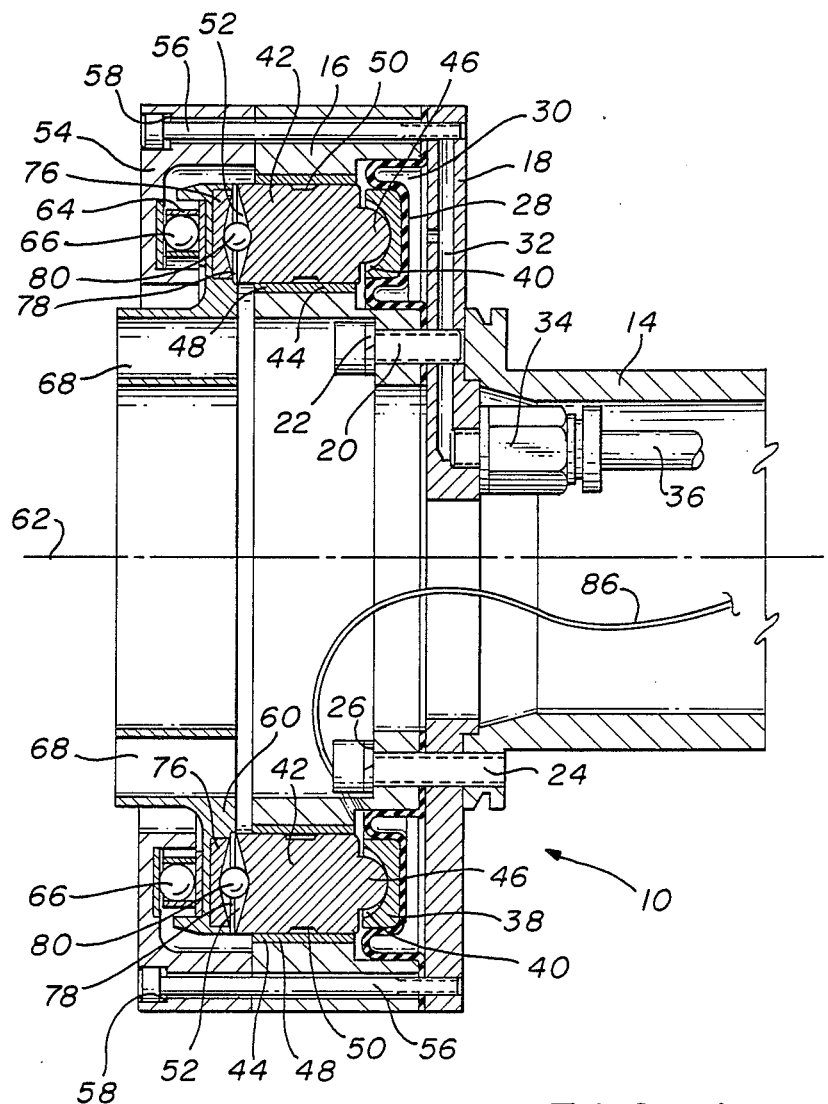
FIG. 1 is a cross-sectional view of a variable compliance device incorporating the invention.
Figure 2:
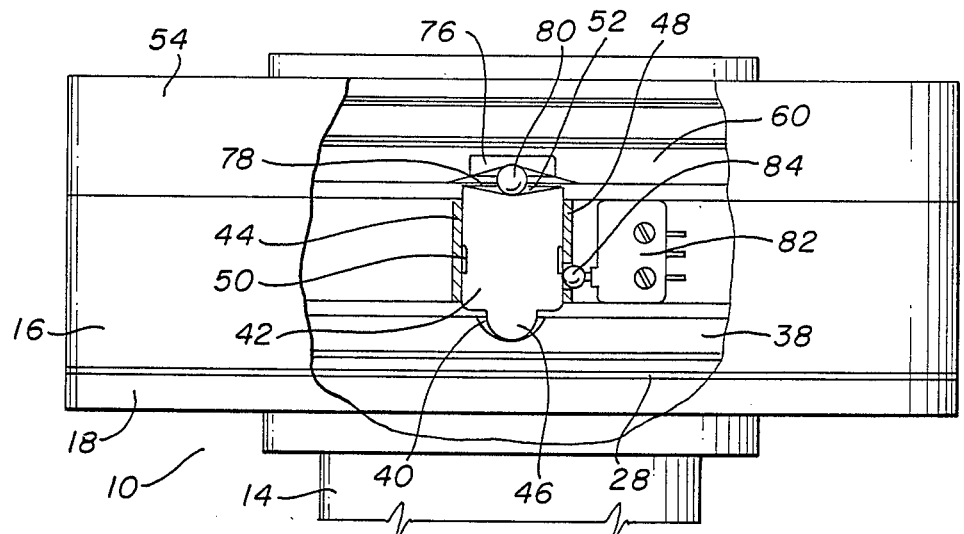
FIG. 2 is a side view, partially in section, of the variable compliance device shown in FIG. 1.
Figure 3:
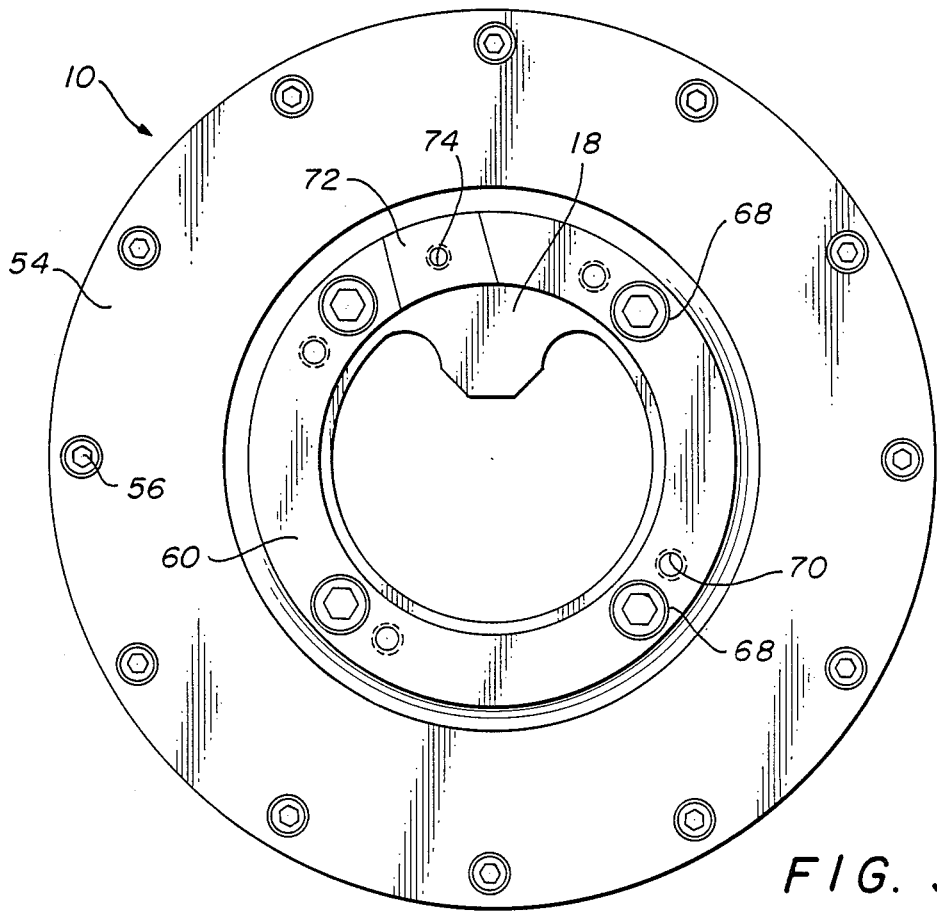
FIG. 3 is a top view of the variable compliance device shown in FIG. 1.

FIGS. 1-3 show one embodiment of the invention. The variable compliance device 10 of the invention is attached to a robot arm 14. A housing 16 and a rear cover 18 are connected together by a plurality of cap screws 20 and lock washers 22. The housing 16 and the rear cover 18 are connected to the robot arm 14 by a plurality of cap screws 24 and lock washers 26.

A resilient diaphragm 28 is mounted between the housing 16 and the rear cover 18. The diaphragm 28 encloses a chamber 30 between the diaphragm 28 and the rear cover 18. Air pressure is provided to inflate the diaphragm 28 through a passageway 32 through the rear cover 18. A fluid input fitting 34 is connected to the end of the passageway 32. Tubing 36 extends from the fitting 34 through the interior of the robot arm 14 to a variable air regulator (not shown). Air or other fluid can be provided through the tubing 36, the fitting 34, and the passageway 32 to inflate or deflate the diaphragm 28 by increasing or decreasing the fluid pressure within the chamber 30.

An annular piston 38 is mounted against the diaphragm 28. As the fluid pressure within the chamber 30 is increased, the inflating diaphragm 28 exerts an increasing force on the annular piston 38 in a direction away from the rear cover 18, to the left in FIG. 1 and upward in FIG. 2. The piston 38 has three conical depressions 40 in the surface opposite the diaphragm 28. The depressions 40 are evenly spaced around the piston 38, and could vary in number, if desired.

Three substantially cylindrical pins 42 are mounted within openings 44 in the housing 16 and are evenly spaced to correspond to the concave depressions 40 in the piston 38. Each pin 42 has a hemispherical head 46 that engages one of the depressions 40 in the piston 38. Self-lubricating bearings 48 between the pins 42 in the housing 16 allow the pins 42 to slide longitudinally relative to the housing 16. Each pin 42 has a shallow groove 50 around the circumference of the pin 42.

The end 52 of each pin 42 opposite the hemispherical head 46 is a conical concave surface 52. The concave surface 52 may have a constant slope angle or the slope angle may change over the diameter of the pin 42.

A front cover 54 is connected to the housing 16 and the rear cover 18 by a plurality of cap screws 56 and lock washers 58. The front cover 54 secures a tool plate 60. The tool plate 60 can move laterally, axially, or longitudinally relative to the front cover 54 and the housing 16. The tool plate 60 can also rotate about the longitudinal axis 62 of the variable compliance device 12. A ball cage 64 and a plurality of bearing balls 66 are mounted between the tool plate 60 and the front cover 54 to facilitate the angular rotation and lateral movement of the tool plate 60 relative to the front cover 54.

The tool plate 60 has a plurality of openings 68 to provide easy access to the cap screws 20 and 24. The tool plate 60 also has four threaded openings 70, shown in FIG. 3, for the attachment of a tool (not shown) to the tool plate 60. A groove 72 and a small threaded opening 74 provide for proper registering of the tool on the tool plate 60.

Three concave ball seats 76 are connected to the tool plate 60 corresponding to the pins 42. The concave ball seats 76 may have a constant slope angle or the slope angle may change over the diameter of the ball seat. The concave ball seats 76 and the concave ends 52 of the pins 42 oppose one another to form ball chambers 78. A bearing ball 80 is mounted within each ball chamber 78 for engagement with the ball seat 76 on the tool plate 60 and with the concave end 52 of each pin 42.

As an alternative, the bearing balls 80 could be integrally formed on the ends 52 of the pins 42. The pins 42 operatively engage the ball seats 76, either directly or through the bearing balls 80.

FIG. 2 illustrates a subminiature basic switch 82, mounted in the housing 16 next to each pin 42. A bearing ball 84 is held against the switch 82 by the side of the pin 42. The switch 82 is connected to an electrically conductive wire 86, shown in FIG. 1. The electric wire 86 leads through the interior of the robot arm 14 to the robot (not shown).

In operation, a robot tool (not shown) is attached to the tool plate 60. Air or other fluid is injected through the air fitting 34 in the air passageway 32 to the chamber 30. The diaphragm 28 is inflated until the fluid pressure within the chamber 30 reaches a selected level. The diaphragm 28 exerts a force on the piston 38 toward the pins 42. The piston 38 forces the pins 42 into the bearing balls 80. A high fluid pressure within the chamber 30 causes the diaphragm 28 to exert a high force against the piston 38 and the pins 42. The high force on the pins 42 resists movement of the tool plate 60 relative to the robot arm 14 and the housing 16.

When the robot tool encounters an obstacle during the operation of the robot, the outside force will cause the tool plate 60 to be moved relative to the housing 16, if the force of the pins 42 on the bearing balls 80 is overcome. The tool plate 60 may be moved longitudinally, laterally, or angularly.

Movement of the tool plate 60 relative to the housing 16 causes the bearing balls 80 to exert a force on the pins 42. This force causes the pins 42 to move longitudinally relative to the housing 16. The slope angles on the concave ball seats 76 and on the concave surfaces 52 of the pins 42 define a spring constant for the pins 42. A constant slope angle will result in a constant force response during lateral compliance of the tool plate 60 relative to the housing 16. A changing slope angle could be used to result in a true spring constant, or even more exotic spring constants that change proportionately to lateral motion.

When the obstacle and the resulting outside force are removed, the force of the pins 42 on the bearing balls 80 causes the tool plate 60 to return to its original position relative to the housing 16. The bearing balls 80 tend to move toward the centers of the concave ball seats 76 and the concave surfaces 52 of the pins 42. During lateral movement, each ball 80 will move equidistant up the concave surface 52 and the ball seat 76, as long as these surfaces remain parallel.

If the pins 42 move beyond a selected point, the bearing balls 84 fall into the grooves 50 on the pins 42, away from the switches 82. The switches 82 are then activated and send a signal through the electric wire 86 to the robot (not shown). The electrical signal may be used in a variety of manners. For example, the signal may shut the robot off or give a warning to the robot operator.

Figure 4:
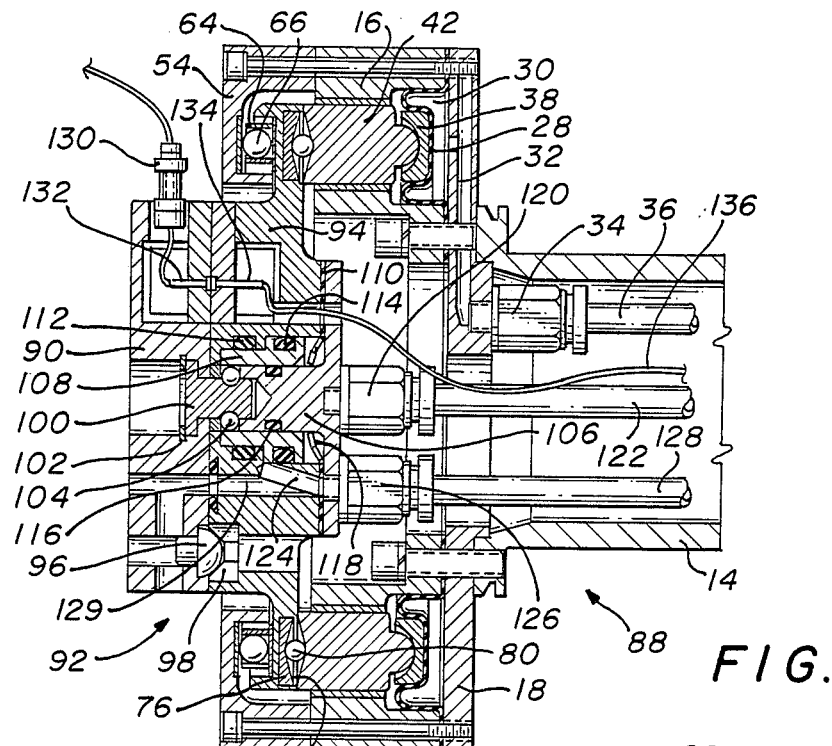
FIG. 4 is a cross-sectional view of the first alternate embodiment of the invention.

FIG. 4 illustrates an alternate embodiment of the invention. In this embodiment, the variable compliance device 88 has a quick change adapter 92 mounted between a modified tool plate 90 and the front cover 54. The front cover 54, the housing 16, the rear cover 18, and the robot arm 14 are identical to the first embodiment.

A diaphragm 28 is mounted between the housing 16 and the rear cover 18, and encloses a chamber 30. The chamber 30 is pressurized by a fluid such as air from a passageway 32, a fitting 34, and tubing 36. The diaphragm 28 exerts a force on a piston 38 and a plurality of pins 42. The pistons 42 exert a force on the bearing balls 80 which are mounted within ball chambers 78 between the pins 42 and ball seats 76.

The ball seats 76 are mounted within a quick change body 94. The quick change body 94 is secured to the housing 16 by the front cover 54. A ball cage 64 and a plurality of bearing balls 66 allow the quick change body 94 to move relative to the front cover 54.

The tool plate 90 is connected to the quick change body 94. A pair of spherical pins 96, mounted on the tool plate 90, engage a pair of conical seats 98 on the quick change body 94 to properly orient the tool plate 90.

The tool plate 90 is secured to the quick change body 94 by a locking pin 100. The locking pin 100 is secured to the tool plate 90 by a bowed retaining ring 102. The locking pin 100 is secured to the quick change body 94 by a plurality of bearing balls 104. The bearing balls 104 engage an annular groove around the circumference of the locking pin 100.

The bearing balls 104 are held within the groove of the locking pin 100 by a ball retainer 106 and a piston 108. The ball retainer 106 is connected to the quick change body 94, and a gasket 110 seals between the ball retainer 106 and the quick change body 94. A body O-ring 112 and a piston O-ring 114 form seals between the piston 108 and the quick change body 94. A ball retainer O-ring 116 seals between the piston 108 and the ball retainer 106. The piston 108 is biased downward toward the bearing balls 104 by a curved spring washer 118. The biasing action of the curved spring washer 118 may be assisted by fluid pressure provided by a fluid such as air from a fitting 120 and tubing 122. Fluid pressure can be supplied to the opposite side of the piston 108 through a passageway 124, a fitting 126, and tubing 128 to force the piston 108 towards the curved spring washer 118 to disconnect the locking pin 100 and release the tool plate 90.

Air pressure can also be applied through another air fitting (not shown) behind the air fitting 126. This air pressure passes through a passageway 129 to allow the tool to perform auxiliary functions, such as closing a gripper.

The modified tool plate 90 has one or more electrical connectors 130 that are connected to one or more fixed electrical contacts 132. These are used to pass electrical signals from the tool to the robot control. The fixed contact 132 engages an electrical spring contact 134 mounted in the quick change body 94. An electrical wire 136 extends from the spring contact 134 through the interior of the robot arm 14 to the robot controller (not shown).

In operation, the embodiment illustrated in FIG. 4 operates similarly to the first embodiment. If the tool encounters an obstacle, the tool plate 90 and the quick change adapter 92 are moved relative to the housing 16. Movement of the quick change adapter 92 relative to the housing 16 causes the pins 42 to move longitudinally relative to the housing 16. When the outside force has been removed, the pins 42 return the quick change adapter 92 to its original position. If the pins 42 are moved beyond a selected point, movement of the pins 42 activates a switch 82 that sends a signal to the robot. The robot can thus be deactivated or a warning signal can be given.

The quick change adapter 92 allows the tool to be changed easily. Air can be injected through the air fitting 126 and the air passageway 124 to cause the piston 108 to move upward away from the tool plate 90. This releases the bearing balls 104 so that the balls 104 move outward away from the locking pin 100. The locking pin 100 and the tool plate 90 can then be pulled away from the quick change adapter 92. A different tool, mounted on a different tool plate 90, can then be inserted into the quick change adapter 92. Air pressure is injected through the air fitting 120 to cause the piston 108 to move downward toward the tool plate 90. The piston 108 forces the bearing balls 104 inward toward the groove in the locking pin 100.

Figure 5:
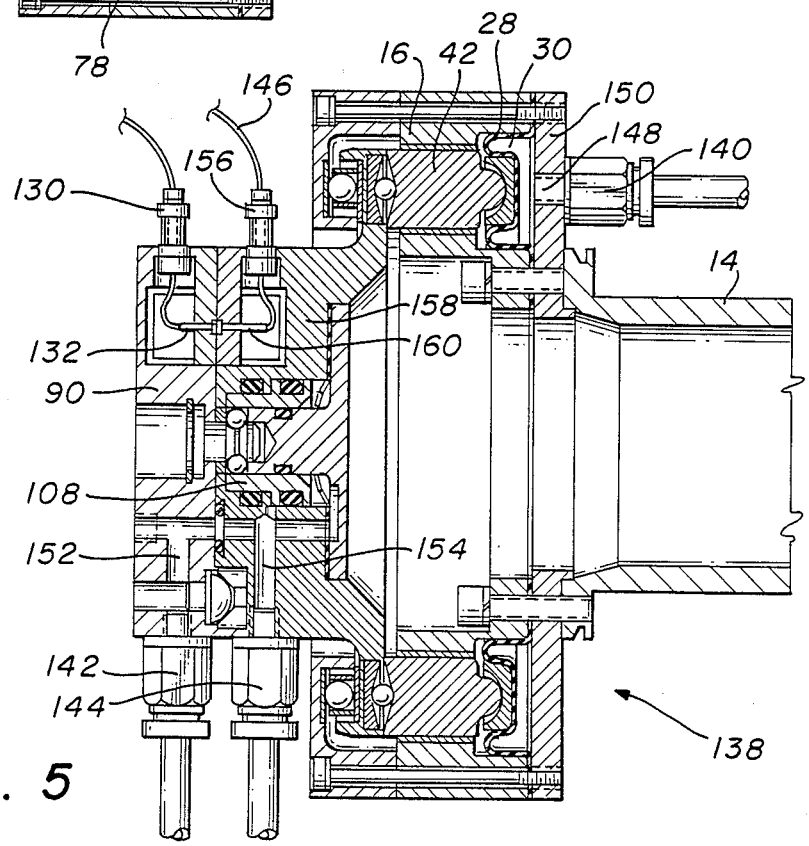
FIG. 5 is a cross-sectional view of a second alternate embodiment of the variable compliance device of the invention.

FIG. 5 illustrates a second alternate embodiment of the invention. The operation of the variable compliance device 138 shown in FIG. 5 is identical to the operation of the variable compliance device 88 shown in FIG. 4. However, in FIG. 5, the air fittings 140, 142, and 144 and the electrical wire 146 are outside of, rather than within, the interior of the robot arm 14.

The air fitting 140 provides air through an air passageway 148 in the modified rear cover 150 to the air chamber 30 enclosed by the diaphragm 28. The air fitting 142 provides air through an air passageway 152 to force the piston 108 downward toward the tool plate 90. The air fitting 144 provides air through a passageway 154 to force the piston 108 upward away from the tool plate 90. Additional air fittings (not shown) provide air pressure to allow the tool to perform various functions, such as closing a gripper.

The electrical wire 146 is attached to an electrical connector 156 that is connected to the exterior surface of the modified quick change body 158. The electrical connector 156 is connected to an electrical spring contact 160 that engages the fixed contact 132 and the electrical connector 130 on the tool plate 90.

In operation, the embodiment of the invention shown in FIG. 5 works identically to the embodiment shown in FIG. 4. Any movement of the tool plate 90 and the quick change body 158 relative to the housing 16 will cause the pins 42 to move longitudinally relative to the housing 16. The pins 42 return the tool plate 90 and the quick change body 158 to their original positions when the outside force is removed. Movement of the pins 42 beyond a selected point is sensed by a sensing means and a signal is sent to the robot.

Figure 6:
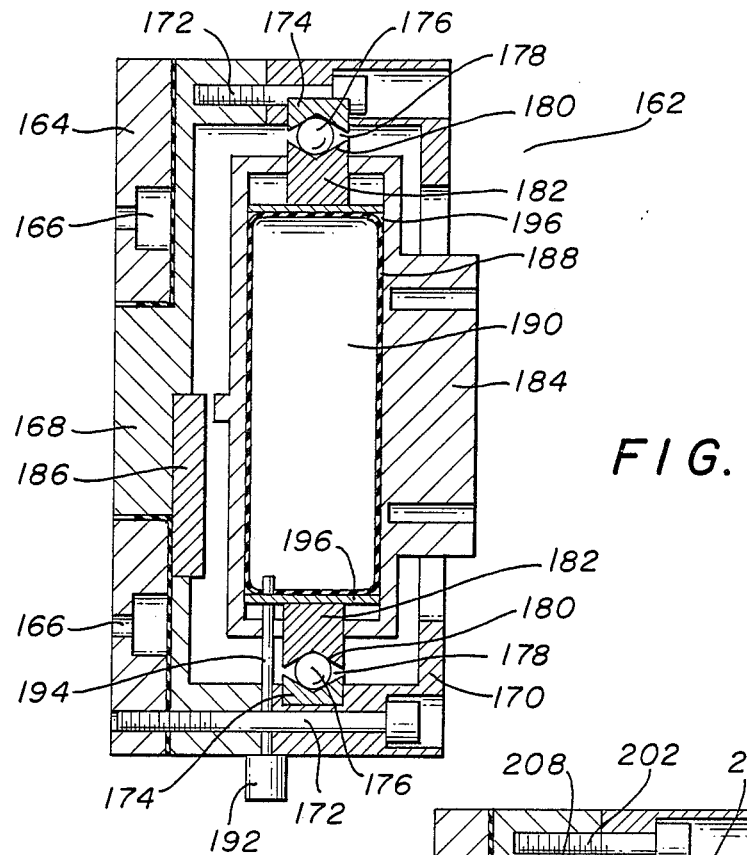
FIG. 6 is a cross-sectional view of a third alternate embodiment of the variable compliance device of the invention.

FIG. 6 shows another embodiment of the invention. In this embodiment, the variable compliance device 162 has a robot adapter plate 164 that may be attached to a robot arm with fasteners inserted through holes 166 in the robot adapter plate 164. The variable compliance device 162 also has a housing 168 and a front cover 170, attached to the robot adapter plate 164 by a plurality of cap screws 172.

Three or more ball seats 174 are mounted around the inner circumference of the front cover 170. A bearing ball 176 is located on each ball seat 174. Each bearing ball 176 is contained within a ball chamber 178 formed by a ball seat 174 and the conical end 180 of a generally cylindrical pin 182.

The pins 182 are mounted around the outer circumference of a tool plate 184. The tool plate 184 is secured by the front cover 170 for limited movement relative to the housing 168. Movement of the tool plate 184 relative to the housing 168 is sensed by an inductive proximity switch 186 mounted on the housing 168.

An inflatable diaphragm 188 encloses a chamber 190 within the tool plate 184. Air can be injected into or expelled out of the chamber 190 through an air hook-up 192 and passageway 194. When air is injected into the chamber 190, the diaphragm 188 exerts a radially outward force on a piston 196. The piston 196 exerts a radially outward force on each of the pins 182. A high fluid pressure within the chamber 190 exerts a high force against the pins 182 and makes it difficult for the tool plate 184 to move relative to the housing 168. A reduced fluid pressure within the chamber 190 makes it easier for the tool plate 184 to move relative to the housing 168.

Figure 7:
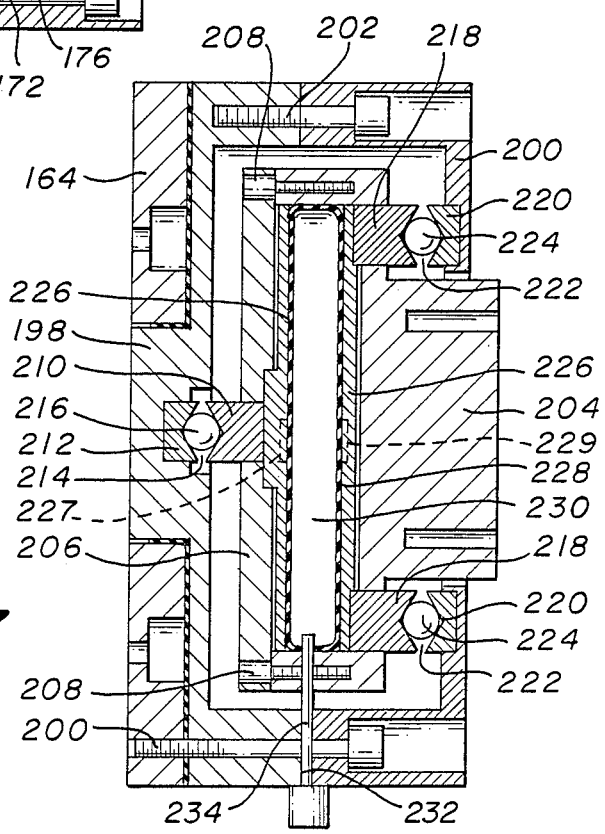
FIG. 7 is a cross-sectional view of a fourth alternate embodiment of the variable compliance device of the invention.

Another alternate embodiment of the invention, shown in FIG. 7, has a robot adapter plate 164, a modified housing 198, and a modified front cover 200, held together by cap screws 202. The front cover 200 secures a tool plate 204. A tool plate cover 206 is secured to the tool plate 204 by cap screws 208.

A single center pin 210 is mounted in the center of the tool plate cover 206, opposite a ball seat 212 mounted in the center of the housing 198. The center pin 210 and the ball seat 212 form a ball chamber 214 that houses a bearing ball 216.

Three or more additional cylindrical pins 218 are mounted around the tool plate 204. These pins 218 oppose a like plurality of ball seats 220 mounted on the front cover 200. The pins 218 and the ball seats 220 oppose one another to form ball chambers 222 that house bearing balls 224.

The tool plate 204 and the tool plate cover 206 house a pair of sensor plates 226 that bear against the ends of the pins 210 and 218. A Hall effect sensor 227 mounted on one of the sensor plates 226 looks across to a magnet 229 mounted on the other sensor plate 226 and detects any relative movement between the sensor plates 226.

A diaphragm 228 houses a chamber 230 between the two sensor plates 226. An air fitting 232 and a passageway 234 povide means for supplying air to the air chamber 230.

Increasing the fluid pressure within the chamber 230 causes the sensor plates 226 to exert a force against the pins 210 and 218. The increased force makes it more difficult for the tool plate 204 to move relative to the housing 198. Movement of the tool plate 204 relative to the tool plate cover 206 is senced by the sensor plates 226.

Only the preferred embodiments of the invention have been illustrated in the accompanying drawings and described in the detailed description. The invention is not limited to the embodiments disclosed, but is intended to embrace any alternatives, modifications, rearrangements, or substitutions of parts or elements as fall within the spirit and scope of the invention.

We claim:

1. A variable compliance device comprising:
   a tool plate for attachment to a tool;
   housing means for coupling the tool plate to a robot arm to allow limited longitudinal, lateral, and rotational movement of the tool plate relative to the robot arm;
   the tool plate and the housing means defining a central, axially extending passageway;
   bearings between said housing means and said tool plate to facilitate lateral and rotational movement of the tool plate relative to the housing means;
   a plurality of concave ball seats mounted on the tool plate and positioned at circumferentially spaced points around the central, axially extending passageway;
   a plurality of balls each recessed in one of the ball seats of the tool plate;
   a plurality of pins each slidably mounted on the housing means and each having a concave surface for operative engagement one of the balls in the concave ball seats so that longitudinal, lateral, or rotational movement of the tool plate relative to the robot arm caused by an outside force causes the pins to move relative to the housing means; and
   pnuematic bias means associated with the pins for exerting a force against the pins towards the concave ball seat to resist movement of the tool plate relative to the housing means and to restore the tool plate to its original position relative to the housing means after the outside force is removed.

2. A variable compliance device comprising:
   a tool plate for attachment to a tool;
   housing means for coupling the tool plate to a robot arm to allow limited longitudinal, lateral, and rotational movement of the tool plate relative to the robot arm;
   the tool plate and the housing means defining a central, axially extending passageway;
   a plurality of concave ball seats associated with the tool plate and located at circumferentially spaced points around the central, axially extending passageway;
   a bearing ball located in each ball seat for movement on the concave surface;
   a plurality of pins, each pin slidably mounted on the housing means and having a concave surface on a first end for engagement with a corresponding one of the bearing balls so that longitudinal, lateral, or rotational movement of the tool plate relative to the housing means caused by an outside force applied to the tool plate causes at least one of the pins to move relative to the housing means; and
   pneumatic adjustable bias means associated with all of the pins for exerting a force against all of the pins toward the bearing balls to resist movement of the tool plate relative to the housing means and to restore the tool plate to its original position relative to the housing means after the outside force is removed.

3. A variable compliance device as recited in claim 2, wherein the bias means is adjustable to exert a selected force against the pin.

4. A variable compliance device as recited in claim 2, wherein the bias means further comprises:
   an inflatable diaphragm operatively engaging the second end of the pin; and
   means for inflating the diaphragm to a selected pressure to resist slidable movement of the pin.

5. A variable compliance device as recited in claim 4, wherein the inflating means extends through the interior of the robot arm.

6. A variable compliance device as recited in claim 2, further comprising sensing means operatively associated with each pin for sensing movement of the associated pin relative to the robot arm beyond a selected point.

7. A variable compliance device as recited in claim 6, wherein the sensing means comprises:
   a subminiature basic switch; and
   a bearing ball initially held against the switch by the pin and released to activate the switch when the pin moves beyond a selected point relative to the robot arm.

8. A variable compliance device as recited in claim 2, wherein the pin is substantially cylindrical and the concave surface is on one end of the cylinder.

9. A variable compliance device as recited in claim 2, further comprising a piston between the pin and the bias means for transfering force from the bias means to the pin.

10. A variable compliance device as recited in claim 2, further comprising a quick change adapter mounted between the tool plate and the robot arm to allow tools to be quickly connected to and disconnected from the tool plate.

11. A variable compliance device as recited in claim 4, further comprising a quick change adapter mounted between the tool plate and the robot mounting arm to allow tools to be quickly connected to and disconnected from the tool plate.

12. A variable compliance device as recited in claim 11, further comprising means for providing fluid pressure to the quick change adapter to connect a tool to the tool plate or to disconnect a tool from the tool plate.

13. A variable compliance device as recited in claim 12, wherein the inflating means and the means for providing fluid pressure to the quick change adapter extend through the interior of the robot arm.

14. A variable compliance device as recited in claim 12, wherein the inflating means and the means for providing fluid pressure to the quick change adapter are outside of the robot arm.

15. A variable compliance device as recited in claim 2, wherein the concave ball seat and the concave surface on each pin have constant slope angles.

16. A variable compliance device as recited in claim 2, wherein the concave ball seat and the concave surface on each pin have changing slope angles to represent a selected spring constant.

* * * * *